(12) United States Patent
Houston et al.

(10) Patent No.: US 10,331,757 B2
(45) Date of Patent: Jun. 25, 2019

(54) ORGANIZING NETWORK-STORED CONTENT ITEMS INTO SHARED GROUPS

(71) Applicant: Dropbox, Inc., San Francisco, CA (US)

(72) Inventors: Drew Houston, San Francisco, CA (US); Chris Beckmann, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 15/873,055

(22) Filed: Jan. 17, 2018

(65) Prior Publication Data

US 2018/0143987 A1    May 24, 2018

Related U.S. Application Data

(63) Continuation of application No. 13/839,528, filed on Mar. 15, 2013, now Pat. No. 9,892,203.

(60) Provisional application No. 61/719,861, filed on Oct. 29, 2012.

(51) Int. Cl.
*G06F 16/958* (2019.01)

(52) U.S. Cl.
CPC ............... *G06F 16/958* (2019.01)

(58) Field of Classification Search
CPC ............................................ G06F 16/958
See application file for complete search history.

(56) References Cited

U.S. PATENT DOCUMENTS

| | | | |
|---|---|---|---|
| 6,973,201 B1 * | 12/2005 | Colmenarez | G06K 9/00369 382/103 |
| 7,469,246 B1 * | 12/2008 | Lamping | G06F 17/30707 |
| 8,385,950 B1 | 2/2013 | Wagner | |
| 2005/0076056 A1 * | 4/2005 | Paalasmaa | G06F 17/30265 |
| 2007/0283403 A1 * | 12/2007 | Eklund, II | G09B 5/06 725/117 |
| 2008/0235084 A1 * | 9/2008 | Quoc | G06Q 30/0242 705/14.41 |
| 2009/0030899 A1 * | 1/2009 | Tareen | G06F 17/30722 |
| 2009/0112782 A1 * | 4/2009 | Cross | G06Q 30/02 706/45 |
| 2009/0234876 A1 * | 9/2009 | Schigel | G06F 17/30873 |
| 2012/0130954 A1 * | 5/2012 | Hood | G06Q 10/10 707/640 |

(Continued)

FOREIGN PATENT DOCUMENTS

EP    2682906 A1 *    1/2014    ........... G06Q 10/109

*Primary Examiner* — Apu M Mofiz
*Assistant Examiner* — Farhad Agharahimi
(74) *Attorney, Agent, or Firm* — Polsinelli PC

(57) ABSTRACT

Systems, methods, and computer-readable storage media for adding users to groups of content items organized into events based on a common attribute. An example system configured to practice the method can receive, from a client device, content items uploaded to a synced online content management system, wherein the content items are associated with an account of a first user. The system can cluster at least some of the content items as an event, wherein the event is associated with a common attribute, and identify a second user satisfying a minimum similarity threshold for the event based on the common attribute. The system can provide a suggestion to share the event with the second user. Upon receiving a confirmation of the suggestion, the system can make content items clustered in the event available to the second user.

20 Claims, 8 Drawing Sheets

(56) References Cited

U.S. PATENT DOCUMENTS

| | | | |
|---|---|---|---|
| 2012/0141092 A1* | 6/2012 | Friedman | H04N 9/8042 386/248 |
| 2012/0254188 A1* | 10/2012 | Koperski | G06F 17/30663 707/740 |
| 2012/0278387 A1* | 11/2012 | Garcia | G06Q 50/01 709/204 |
| 2013/0117365 A1* | 5/2013 | Padmanabhan | H04W 4/206 709/204 |
| 2013/0132444 A1* | 5/2013 | Chen | G06F 17/3028 707/804 |
| 2013/0346849 A1* | 12/2013 | Krueger | G06F 17/3089 715/234 |
| 2014/0012926 A1* | 1/2014 | Narayanan | G06Q 50/01 709/206 |

* cited by examiner

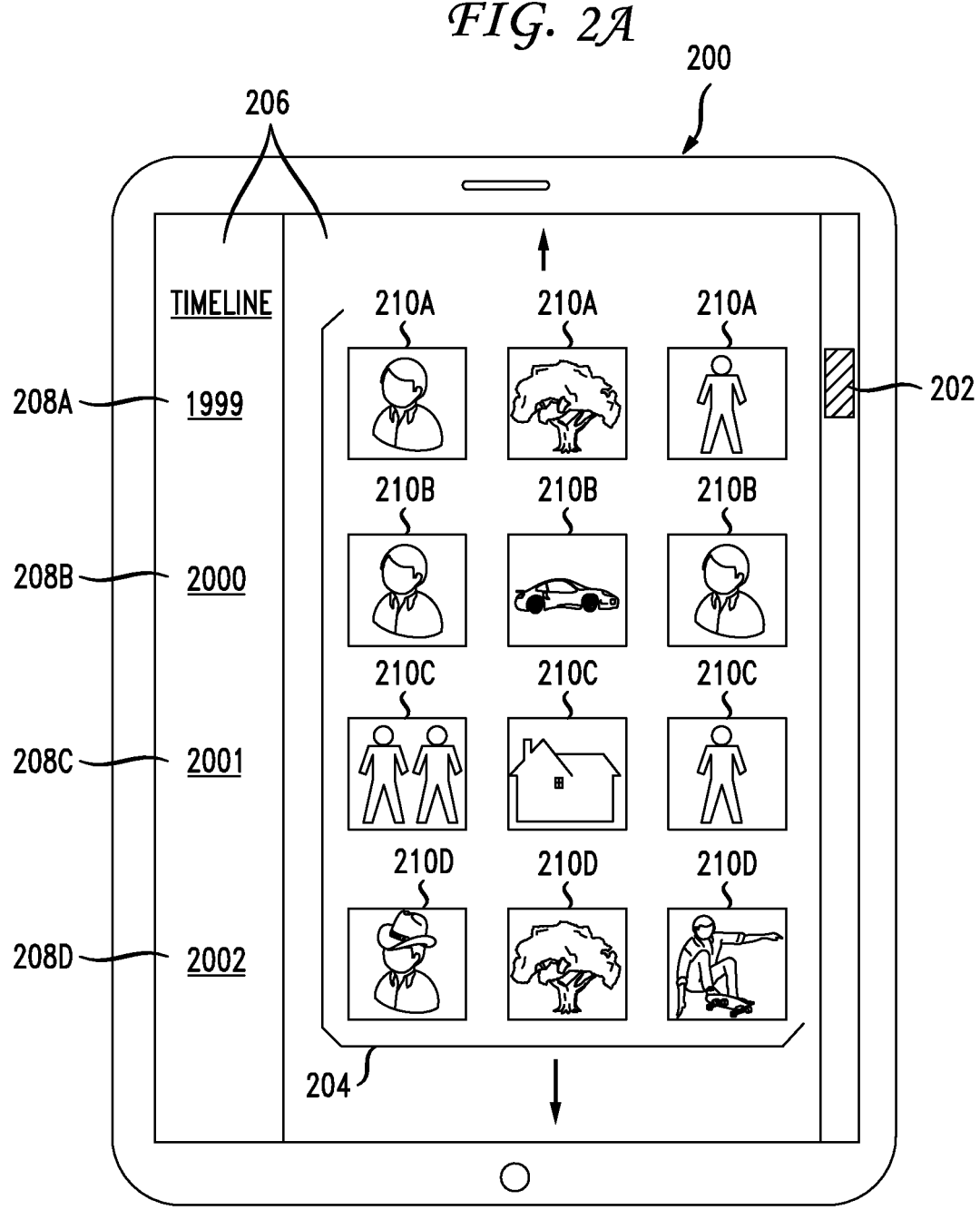

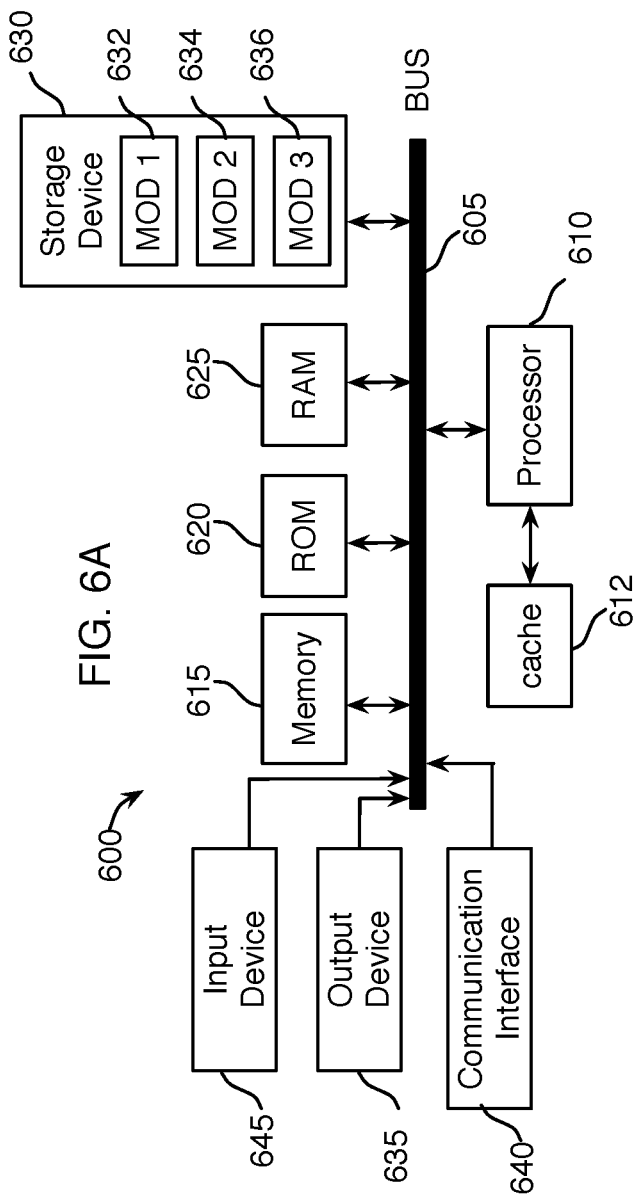

ORGANIZING NETWORK-STORED CONTENT ITEMS INTO SHARED GROUPS

CROSS REFERENCE TO RELATED APPLICATIONS

This application is a continuation of U.S. patent application Ser. No. 13/839,528, filed on Mar. 15, 2013, entitled, "ORGANIZING NETWORK-STORED CONTENT ITEMS INTO SHARED GROUPS", which claims the benefit of priority under 35 U.S.C. § 119(e) to U.S. Provisional Patent Application No. 61/719,861, filed on Oct. 29, 2012; both of which are incorporated herein by reference in their entireties.

TECHNICAL FIELD

The present technology pertains to grouping content items that are stored in a network-based content management system, and more specifically pertains to organizing content items into groups and sharing the groups.

BACKGROUND

Media recording capabilities, such as photographing and video recording, have been integrated with remarkable regularity in a score of common, everyday devices. The ubiquity of such media recording capabilities has prompted a growing demand for media applications, particularly to access media stored on different devices and to share media with other users. The Internet has further fueled the demand for media applications by greatly expanding the amount of media available to users and providing an ever widening audience for conveniently sharing media.

Numerous tools have emerged that allow users to share and access media through Internet-connected devices. For example, an online storage provider can allow users to share and access files, including media files such as photos, through a web browser from any Internet-connected device. Users can browse photos and search image content through an application on a client device.

However, as users store more and more photos, the organization of such photos can become a cumbersome and time consuming chore. Some users may not bother due to the large amount of time required to organize their photos, while others may begin to organize their photos and give up half way. Properly organized photos can allow users to search, browse, share, and otherwise manage their photos more efficiently and easily, but the barriers to proper organization remain high.

SUMMARY

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out hereinafter. These and other features of the disclosure will become more fully apparent from the following description and accompanying drawings, or can be learned by the practice of the principles set forth herein.

The approaches set forth herein can be used to assist in organizing content items into collections for improved browsing, sharing, and management of content items. For example, a user can upload photos or other images into a photo collection hosted by a synced online content management system. Herein, photos will be used as an example of content items for purposes of illustration; however the principles disclosed herein are not limited to photos. The synced online content management system can host the photo collection and make the collection available for the user to access, such as via a web interface or a platform-native client interface. The interface can provide access to all or part of the photo collection, but in one embodiment can provide a single scrollable view of the entire photo collection with a fixed location navigation bar organized by events or albums in the photo collection that represents the entire photo collection. The synced online content management system can categorize each photo into one or more albums or events. Initially, the albums or events can be simple dates or date ranges, such as December 2011, Spring Break 2012, or Holidays 2007.

In one implementation, the synced online content management system can generate automatic labels for the photo collection based on specific dates, and organize the photos by date. The system can present the photo collection with an index generated using the automatic labels. A user can then provide additional descriptions, labels, or adjustments to the automatic labels and to which photos the automatic labels apply. For example, the synced online content management system can generate an automatic label of June 2012, but June 2012 may contain more than 500 photos from multiple discrete events. While June 2012 is an accurate description, it may not be very helpful for a user trying to find a particular photo from a specific event. The system can analyze the photos in the June 2012 index to analyze similarities in metadata, time, location, content, upload time, and so forth, to determine or suggest sub-groups in June 2012 and prompt the user to confirm or modify the sub-groups and provide labels for the sub-groups. Alternatively in an example where the June 2012 index contains a smaller, more manageable amount of photos, the system may not break out the June 2012 index into sub-groups, but instead let the user relabel June 2012 to some other, more descriptive name. The synced online content management system can use these groups not only for navigational purposes in a photo browsing or management interface, but can also use these groups as logical groups of photos that can be shared with others or linked to.

One photo can be associated with multiple groups. When a user shares a larger group with a recipient, the system can also share the organization of any smaller sub-groups contained therein for the ease of browsing by the recipient. The user can further select certain sub-groups in a larger group to include or exclude from sharing with the recipient.

The system can assign every photo in a displayed view to a cluster, event, or group. For example, each photo can be associated, at a minimum, with an automatically generated cluster, event, or group based on a date rage. In one aspect, the automatically generated groups are months. However, certain month clusters may not make much sense if the actual event depicted therein spans a month boundary. After the synced online content management system assigns an initial label to an event identified by a time range, the synced online content management system can present the user the option to name or modify the event. The synced online content management system can prompt the user to name or modify the event upon an import event, for example. The synced online content management system can perform a content analysis of similarities of photos, faces or places found in the photos, and photo metadata to suggest event boundaries that are most probable. If geolocation data is available, the synced online content management system can generate a suggested title based on a location, destination, or route. The suggested title can further be based on email or other correspondence of the user, documents uploaded to the synced online content management system, or calendar entries. An event can be 'in progress' so that a user can continue to add photos to the event.

Disclosed are systems, methods, and non-transitory computer-readable storage media for adding users to groups of content items organized into collections based on a common attribute, such as photos organized into events. An example system configured to practice the method can receive, from a client device, content items uploaded to a synced online content management system, wherein the content items are associated with an account of a first user. The system can cluster at least some of the content items as an event, wherein the event is associated with a common attribute, and identifies a second user satisfying a minimum similarity threshold for the event based on the common attribute. The system can provide a suggestion to share the event with the second user. Upon receiving a confirmation of the suggestion, the system can make content items clustered in the event available to the second user.

The system can detect events in a collection of content items uploaded to a synced online content management system, and assign labels to the events. An example system can receive, from a user, content items uploaded to an account at a synced online content management system. The system can present to the user a list of content items associated with the event, and receive from the user a selection from the list of content items. The system can modify which content items are included in the event accordingly based on the selection. The system can cluster at least some of the content items as an event corresponding to chronological boundaries, wherein the event has a unique identifier within the synced online content management system. The system can assign an initial label to the event, wherein the initial label is based on a time range of content items clustered in the event. For example, the initial label can be a date and time, a date, or a date range.

The system can receive, in response to a user prompt, a user-specified label for the event. The system can provide the user prompt to the user in association with an content items import operation, such as before, during, or after an content items import operation. For example, the system can prompt the user while content items are being uploaded, or after content items are uploaded and a content and/or metadata analysis has been performed. In one variation, the system can determine a probable label for the event based on an analysis of content items clustered in the event, and suggest the probable label to the user as part of the user prompt. The system can replace the initial label for the event with the user-specified label, and can present a view of the content items organized by event. The system can provide suggestions to the user based on an analysis of previously labeled events, an analysis of friends' labels for events, metadata or tags associated with the content items, and so forth. The system can determine a set of probable labels for the event based on an analysis of content items clustered in the event, and present the set of probable labels to the user. The user can select one of the probable labels, and the system can replace the initial label for the event with the probable label selected by the user.

After events are labeled, the system can process additional content items. The system can receive additional content items from the user after clustering a set of content items. The system can identify that the additional content items are within a threshold similarity to an already labeled event, and clusters the additional content items with the already labeled event. In specific time-sensitive events, which may be ongoing over a period of time, the system can mark the event as 'open' to additional content items. However, after a threshold amount of time has passed since a last content items was added to the event, the system can mark the event as 'closed' to adding more content items automatically. A user or owner of the event or content items in the event can override a 'closed' event and add more files manually.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 2A shows an example user interface for providing a continuous presentation of a set of images using automatically generated date-based event labels;

FIG. 6A shows a conventional system bus computing system architecture; and

DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for a user to be able to share groups of content items, such as photos organized in an album or photos associated with a particular event with other users. When a user organizes photos according to an event, for example, the photos associated with the event also may relate to or be of interest to other users (such as others who participated in the event). In some cases, the user may not even know who the other users are, how to discover them, or how to contact them. The system can analyze the photos in the event, as well as any additional data provided by the user or by other internal or external sources, to determine what, if any, attributes the photos associated with the event have in common. Then, based on those attributes, the system can search for other users who may be interested in or associated with the event. For example, the system can determine that the photos in an event were generated in a particular time frame and at a particular location. The system can attempt to locate other users who have a calendar event or other tasks or documents indicating participation at that location at that time, with which to share all or part of the photos of the event uploaded by the first user. The system can determine which portion of the images in the event to share with different users based on the level of similarity or overlap between the event or the first user and the different users. In another aspect, the system can accept, from the additional users who are granted access to the event, additional images which are a sufficient match for the attributes of the event. For example, if the second user has taken some of their own photos, the second user can contribute, via their client device or online storage account, those photos to the event.

Figure 1:
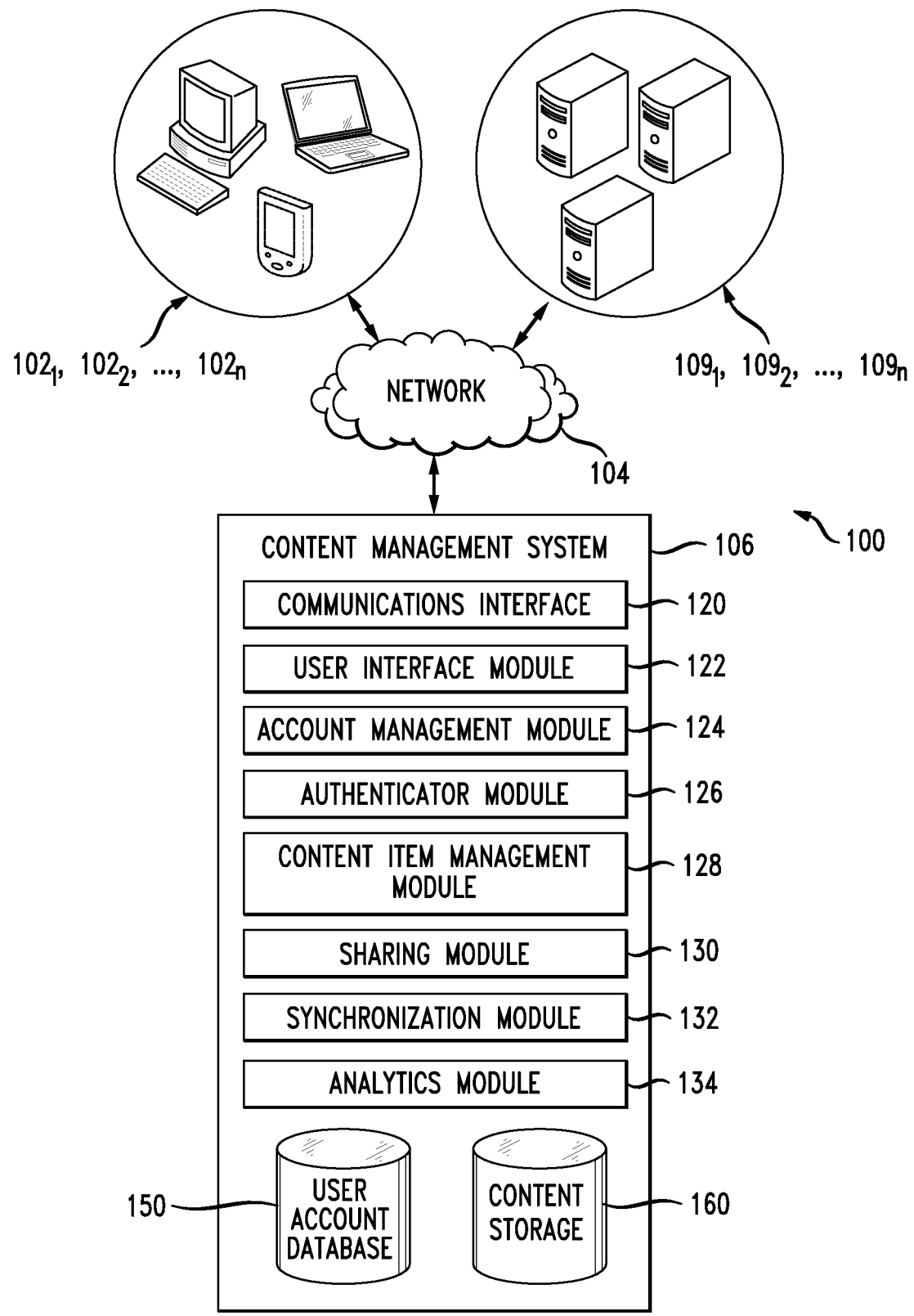
FIG. 1 shows an exemplary configuration of devices and a network.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

An exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via a network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can include a content management module 128 for maintaining a content directory. The content directory can identify the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the architectural configuration of system 106 is simply one possible configuration and that other configurations with more or less components are also possible. For example, the content management system 106 can include an event attribute identifier that determines which attributes are relevant or significant for a particular event or grouping of content items, a similarity scanner that checks for other users who are within a threshold similarity to the attributes, and an event merging module that manages how to add new users and new files to the event.

A person of skill in the art will recognize that while the disclosure frequently uses photos and albums to illustrate the technology, a content item can be of any file type and the content items can be in any organizational unit without parting from the spirit and scope of the disclosure. For example, content items can be documents, videos, and audio, and organizational units can be albums, document workspaces, video galleries, and playlists. Additionally, an organizational unit can include multiple different content item types.

FIG. 2A shows an example user interface for providing a continuous presentation of a set of images using automatically generated date-based event labels. Web page 200 can provide a continuous presentation of the set of images on a device having a memory available for use by the web page that is less than a size of the set of images. Moreover, web page 200 can be based on the size of the set of images. For example, web page 200 can be larger as the size of the set of images increases. The way elements in web page 200 are displayed can also depend on the size and number of the images.

The displayed portion of web page 200 can include a timeline of images 206 and scroll bar 202 for scrolling through web page 200. Scroll bar 202 can be used to scroll through the continuous presentation of the images. Web page 200 can detect a scroll event and load images in areas of web page 200 located in the same area and/or direction of the scroll event. Web page 200 can also unload images in areas of web page 200 located away from the direction/area of the scroll event. For example, as scroll bar 202 moves towards an area of web page 200, web page 200 can load images in that area of web page 200, including any portions around that area of web page 200. Moreover, as scroll bar 202 moves towards an area of web page 200, web page 200 can also unload images that are away from that area of web page 200.

Timeline of images 206 can include images 210A-D, which are mapped to area 204 in web page 200 that is associated with the current position of scroll bar 202. Timeline of images 206 can also include list of dates 208A-D associated with images 210A-D in area 204 of web page 200. List of dates 208A-D can be automatically generated event labels, which can be based on photo metadata, time of upload, or other photo contents or metadata. Upon upload or at some other time, the synced online content management system can prompt the user to provide replacement labels or to update the existing labels. The user can choose to keep the automatically generated labels based on date, supplement the labels, add new labels, or enter completely new labels. Images 210A-D can be arranged according to list of dates 208A-D. For example, images 210A are associated with date 208A, and are thus grouped based on date 208A. Similarly, images 210B are associated with date 208B, and grouped based on date 208B. Likewise, images 210C and 210D are associated with dates 208C and 208D, respectively, and also grouped accordingly.

Images 210A-D can be arranged in chronological order or reverse chronological order, based on dates 208A-D. Dates 208A-D can represent the dates images 210A-D were created, received, recorded, edited, added, etc. Dates 208A-D can also represent the date of an event associated with an image. Timeline of images 206 can also include additional details associated with images 210A-D. For example, timeline of images 206 can provide a title, name, event, location, and/or description for each of images 210A-D. For example, instead of, or in addition to, dates 208A-D, timeline of images 206 can sort images 210A-D by album title and list the album title instead of, or in addition to, dates 208A-D.

Figure 2B:
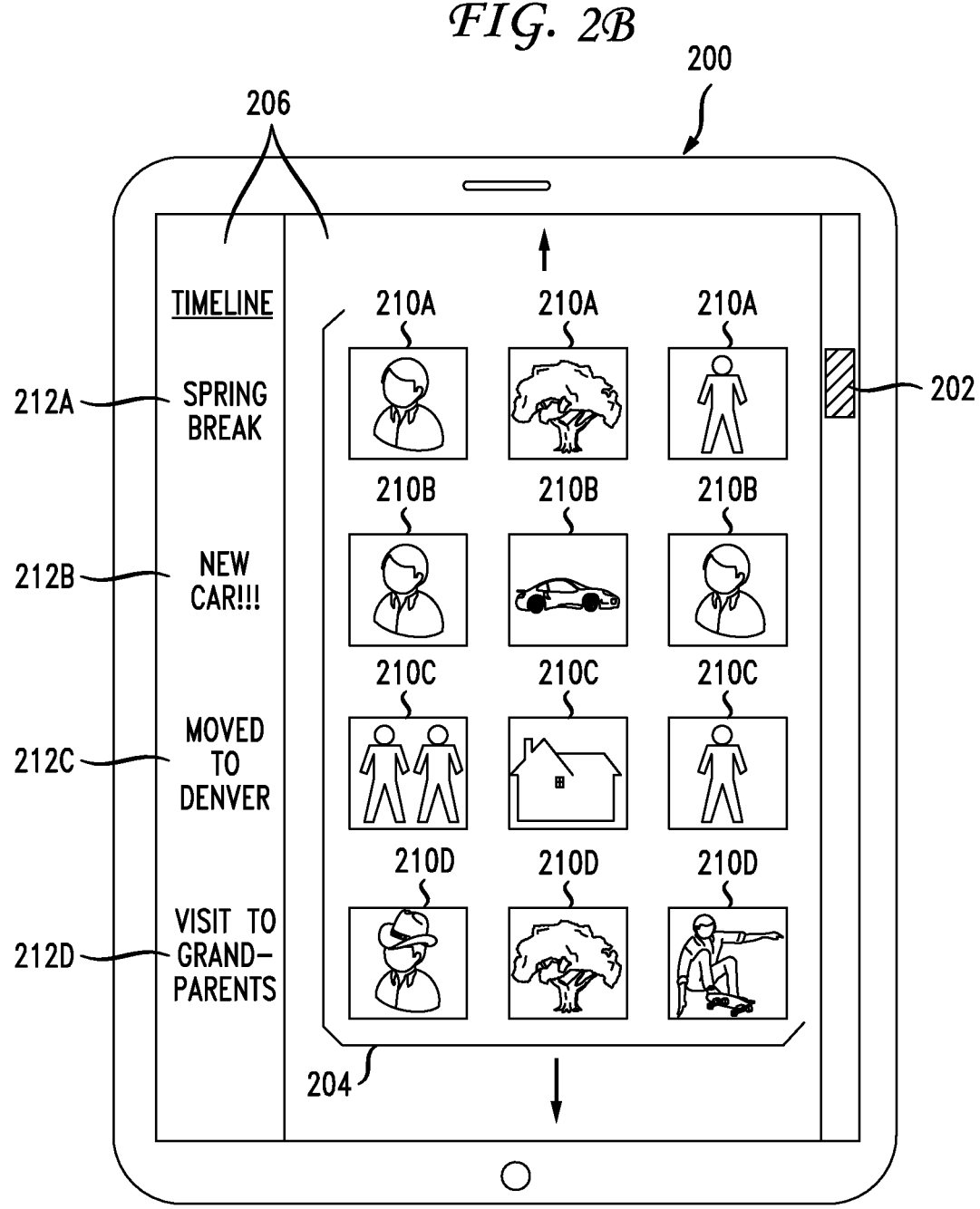
FIG. 2B shows the example user interface with user-provided event labels.

FIG. 2B shows the example user interface with user-provided event labels 212A-D. In this example, the system can present to the user each of the automatically generated labels 208A-D: 1999, 2000, 2001, 2002. The user can manually enter updated labels 212A-D of "Spring Break," "New Car!!!," "Moved to Denver," and "Visit to Grandparents." The system can assign the new labels to the existing photo groupings. In one variation, the user can modify not only the title of the automatically labeled groups, but can also modify which photos are included in a particular group. In situations where each photo in a collection must be associated with a group and in which a user chooses to exclude a photo from an automatically generated group, the system can reassign the excluded photo to another group, or can create a new group for excluded photos. Groups can overlap, such that an individual photo in a collection may be associated with multiple groups. In a shared or collaborative environment, groups describing organization of photos available to multiple users can be specific to a particular user. Different users may desire different organization of the same group of photos. For example, a presenter at a training conference may desire to organize photos of the training conference differently than an organizer or an attendee of the same training conference. Thus, the system can provide user-specific prompts to group, label, or organize a collection of common photos of the training conference, and can separately maintain the various user-specific groups and labels for the photos.

Figure 3:
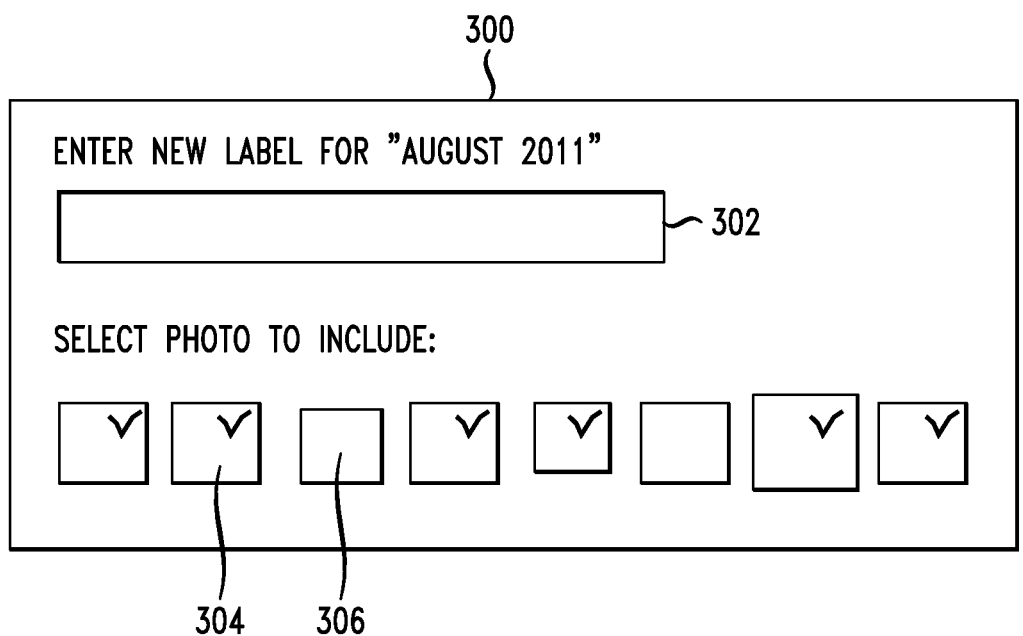
FIG. 3 shows an example prompt for a user to modify an existing automatically generated event label.

FIG. 3 shows an example prompt 300 for a user to modify an existing automatically generated event label. The system can provide input box 302 for text input for a new label for an automatically generated group of photos. The system can also be configured to accept text input, voice input, gesture input, or a thumbnail image as part of the new label. In this case, the automatically generated label is "August 2011", and the user can enter a replacement label such as "Family Reunion in Oklahoma August 2011." Further, as part of modifying the automatically generated group and label, the system can present a list of thumbnails of photos, from which the user can include or exclude photos from the group. For example, the list of thumbnails can include thumbnails with checks 304 indicating that they will be included in the modified group, and thumbnails without checks 306 indicating that they will not be included in the modified group. The user can create multiple overlapping groups from the automatically generated group. For example, the user can generate a different label and select a different subset of the photos of the family reunion for one side of the family, and another set for the other side of the family. Similarly, the user can select only photos containing grandchildren and provide a corresponding label.

The user can share a labeled group and its photos as a unit. The user can organize and label a group based on an automatically generated event, and share the group. Then, as additional photos are added to the group, the shared group is automatically updated so that when recipients of the shared group subsequently access the group, the additional photos are also included. The system can analyze the contents, metadata, actions associated with a group, and any available external data such as contacts, social network data, calendar events, and so forth, to determine possible individuals with which to share the group. For example, if more than a threshold of photos include a same recognized face of a user that matches a profile picture of a Facebook contact of the owner of the group, the system can recommend to the user to share the group of photos with that Facebook contact. In another example, the system can compare geotagging data of the photos to the group owner's calendar items to determine that the photos were taken at a children's soccer game. The system can then pull data from external sources, such as a coach's email to the parents, to determine which others may be interested in the photo group. In the case of a list of parents' emails, the system can present a list of sharing candidates to the owner of the photo group, and the owner can individually select or approve each sharing candidate. In one variation, the owner can further specify, or the system can recommend, sharing permissions for each sharing candidate. The sharing permissions can indicate whether a sharing candidate can re-share the group, add photos to the group, tag photos, comment on the photos, delete photos, add photos, and so forth.

Figure 4:
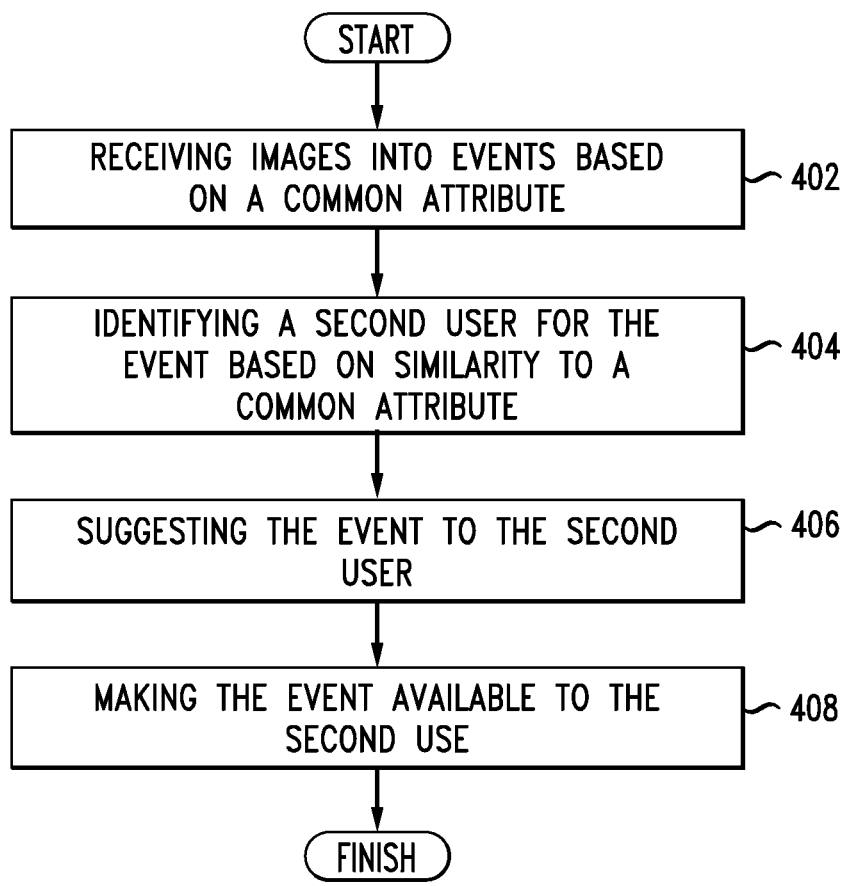
FIG. 4 shows a first example method embodiment for sharing events in a photo collection with other users.
Figure 5:
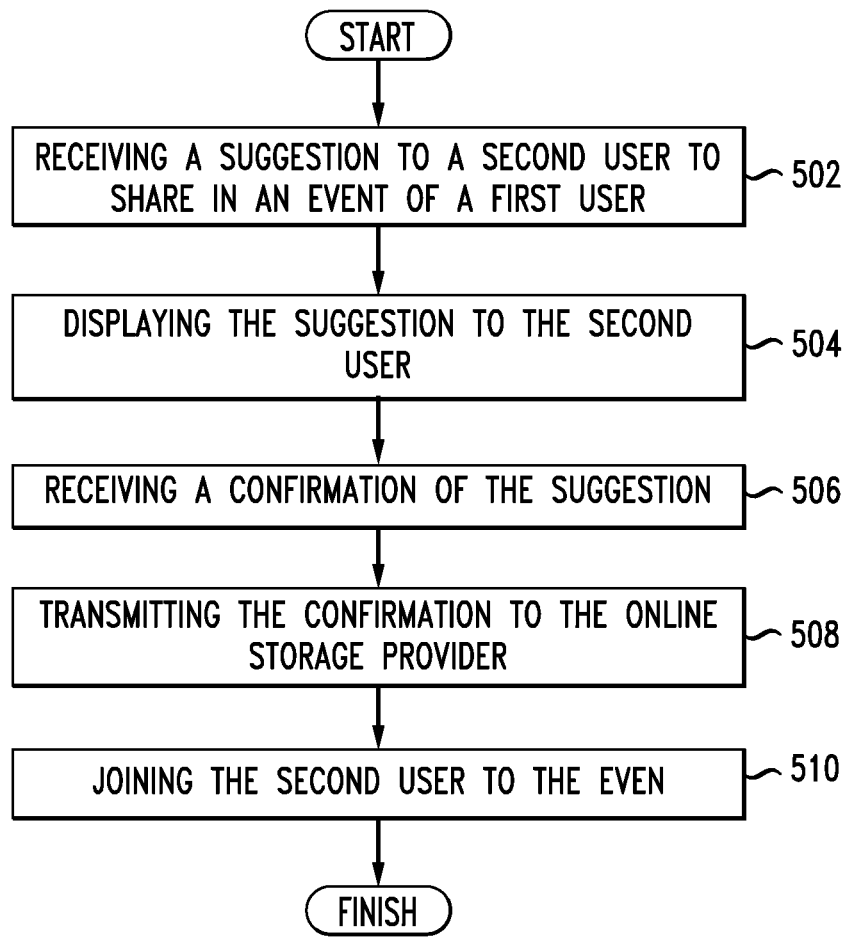
FIG. 5 shows a second example method embodiment for receiving an invitation to participate in a shared event.

Having disclosed some system components and concepts, the disclosure now turns to the exemplary method embodiments shown in FIGS. 4 and 5. For the sake of clarity, the methods are described in terms of an exemplary system 100, as shown in FIG. 1, configured to practice the respective methods. The steps outlined herein are exemplary and can be implemented in any combination thereof, including combinations that exclude, add, or modify certain steps.

FIG. 4 shows a first example method embodiment for sharing events in a photo collection with other users. Content management system 106 can receive images from a client device, wherein the images are associated with an account of a first user (402). Content management system 106 can send to a client device associated with the account a list of images associated with the event, and receive a selection from the list of images. Content management system 106 can modify which images are included in the event accordingly based on the selection.

Content management system 106 can cluster at least some of the images as an event, wherein the event is associated with a common attribute, such as a shared set of chronological boundaries, a shared location, a user selection or indication of commonality, shared tags, and so forth. Content management system 106 can assign the event a unique identifier. Content management system 106 can identify a second user satisfying a minimum similarity threshold for the event based on the common attribute (404).

Content management system 106 can provide a suggestion to share the event with the second user (406), and upon receiving a confirmation of the suggestion, content management system 106 can make images clustered in the event available to the second user (408). In one aspect, in response to a user prompt, content management system 106 can provide a user-specified label for the event. Content management system 106 can provide the user prompt in association with an image import operation, such as before, during, or after an image import operation. For example, content management system 106 can prompt the user while images are being uploaded, or after images are uploaded and a content and/or metadata analysis has been performed. In one variation, content management system 106 can determine a probable label for the event based on an analysis of images clustered in the event, and suggest the probable label to the user as part of the user prompt. Example user specified labels include "St. Patricks Day 2010", "Aspen Skiing Trip", and "Software Developer Conference Apr. 7-14 2012".

Content management system 106 can replace the initial label for the event with the user-specified label (410), and can present a view of the images organized by event. Content management system 106 can provide suggestions to the user based on an analysis of previously labeled events, an analysis of friends' labels for events, metadata or tags associated with the images, and so forth. Content management system 106 can determine a set of probable labels for the event based on an analysis of images clustered in the event, and present the set of probable labels to the user. The user can select one of the probable labels, and Content management system 106 can replace the initial label for the event with the probable label selected by the user.

After events are labeled, content management system 106 can process additional images. Content management system 106 can receive additional images from the user after clustering a set of images. Content management system 106 can identify that the additional images are within a threshold similarity to an already labeled event, and clusters the additional images with the already labeled event. In specific time-sensitive events, which may be ongoing over a period of time, content management system 106 can mark the event as 'open' to additional images. However, after a threshold amount of time has passed since a last image was added to the event, content management system 106 can mark the event as 'closed' to adding more images automatically. A user or owner of the event or images in the event can override a 'closed' event and add more files manually.

FIG. 5 shows a second example method embodiment for receiving an invitation to participate in a shared event. Client device $102_i$ can receive a suggestion addressed to a second user to share in an event of a first user (502). The event can include images uploaded to content management system 106 organized based on a common attribute, and the suggestion can indicate that the second user satisfies a minimum similarity threshold with the common attribute. Client device $102_i$ can display to the second user the suggestion (504) and optionally include an indication that the minimum similarity threshold is satisfied. Client device $102_i$ can receive, from the second user, a confirmation of the suggestion (506), and transmit the confirmation to content management system (508). Client device $102_i$ can optionally join the second user to the event or cause the second user to be joined to the event. Upon joining the event, the second user can manually contribute images to the event, or Client device $102_i$ can automatically scan images in the second user's account to determine which to contribute.

Figure 6B:
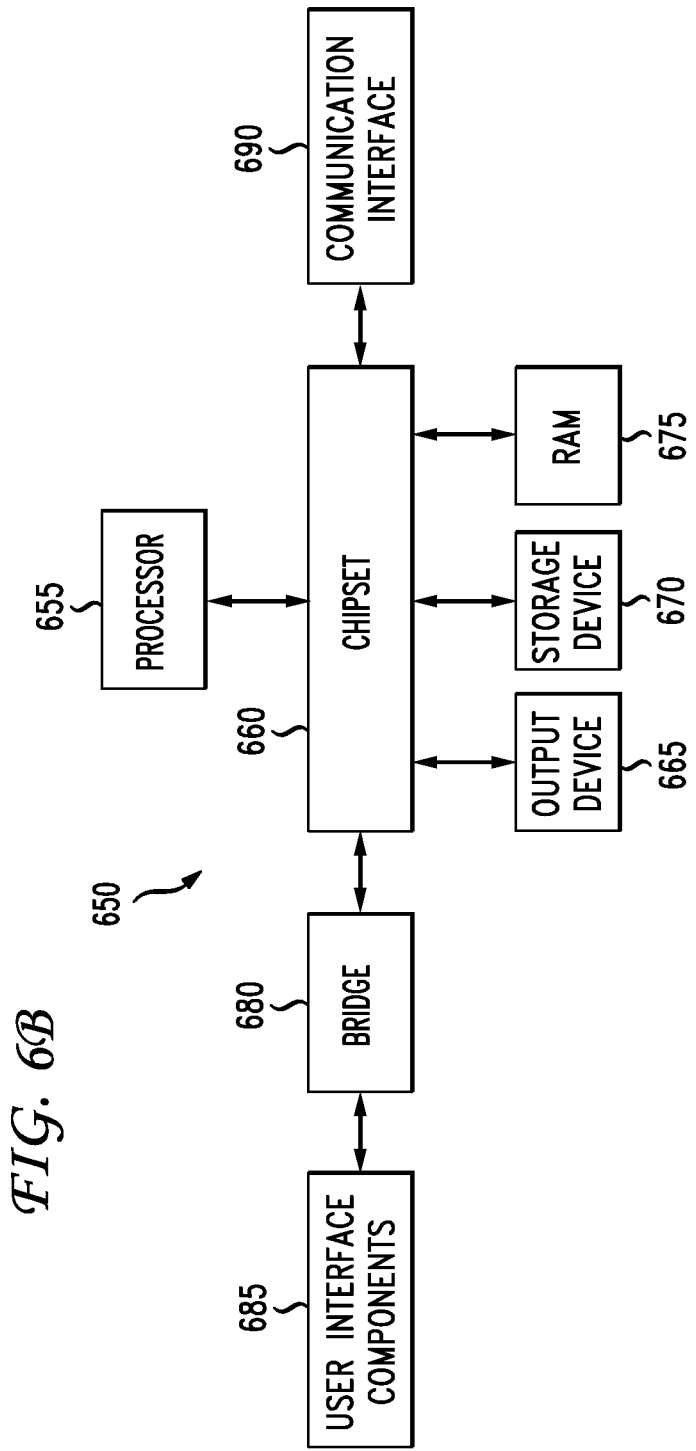
FIG. 6B shows a computer system having a chipset architecture.

FIG. 6A, and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A system comprising:
    a processor;
    a computer-readable storage medium having stored therein processor-executable instructions for causing the processor to:
        determine a common attribute for a plurality of content items;
        cluster the plurality of content items having the common attribute, as an event content collection;
        exclude a subset of the plurality of content items from the event content collection;
        determine a second common attribute for the excluded subset of the plurality of content items;
        reassign the excluded subset of the plurality of content items to a new cluster having the second common attribute; and
        share the event content collection with a user account that satisfies a minimum similarity threshold for an event based on the common attribute of the event content collection.

2. The system of claim 1, wherein the computer-readable storage medium further contains instructions for causing the processor to:
    provide a suggestion to share the event content collection to a first user account, in association with a content item import operation for importing one or more content items from a client device to a synced online content management system.

3. The system of claim 1, wherein the computer-readable storage medium further contains instructions for causing the processor to:
    determine a probable label for the event content collection based on an analysis of content items clustered in the event content collection; and
    include the probable label when the event content collection is shared.

4. The system of claim 1, wherein the computer-readable storage medium further contains instructions for causing the processor to:
    determine a plurality of probable labels for the event content collection based on an analysis of the plurality of content items clustered in the event content collection;
    present the plurality of probable labels to a first user account and a second user account;
    receive selections of the probable labels from the first user account and the second user account; and
    based on the selections, assign one of the probable labels to the event content collection.

5. The system of claim 1, wherein the computer-readable storage medium further contains instructions for causing the processor to:
    present to the user account a list of content items associated with the event content collection;
    receive an indication of additional content items from a second user account; and
    include the additional content items in the event content collection.

6. The system of claim 1, wherein the computer-readable storage medium further contains instructions for causing the processor to:
    receive additional content items from a first user account;
    identify that the additional content items are within a threshold similarity to the event content collection;
    cluster the additional content items into the event content collection; and
    notify a second user account of the additional content items.

7. The system of claim 6, wherein the computer-readable storage medium further contains instructions for causing the processor to:

mark the event content collection as closed to adding more content items after elapsing of a predetermined amount of time since a last content item was added to the event.

8. The system of claim 1, wherein the computer-readable storage medium further contains instructions for causing the processor to:
join a second user account to the event content collection when the user account accepts a suggestion to share the event content collection;
after joining the second user account to the event content collection, scan the second user account for content from the second user account to contribute to the event content collection;
identify one or more content items from the second user account to contribute to the event content collection, the one or more content items having the common attribute; and
add the one or more content items from the second user account to the event content collection.

9. A computer-implemented method comprising:
determining a common attribute for content items;
clustering, by a processor, the content items having the common attribute to yield an event content collection;
excluding, by a processor, a subset of the content items from the event content collection;
determining a second common attribute for the excluded subset of the plurality of content items;
reassigning, by a processor, the excluded subset of the content items to a new cluster having the second common attribute;
identifying, by a processor, a user account satisfying a minimum similarity threshold for an event based on the common attribute of the event content collection; and
sharing, by a processor, the event content collection with the user account.

10. The method of claim 9, further comprising:
providing, by a processor, a suggestion to share the event content collection to a second user account upon approval by the user account.

11. The method of claim 9, further comprising:
determining, by a processor, a probable label for the event content collection based on an analysis of the content items clustered in the event content collection and on the common attribute; and
including, by a processor, the probable label when transmitting a confirmation approving sharing the event content collection.

12. The method of claim 9, further comprising:
determining, by a processor, a plurality of probable labels for the event content collection based on an analysis of content items clustered in the event content collection and on the common attribute;
presenting, by a processor, the plurality of probable labels to a second user account;
receiving, by a processor, from the second user account a selection of one of the probable labels; and
including, by a processor, the probable label when transmitting a confirmation approving sharing the event content collection.

13. The method of claim 9, further comprising:
presenting, by a processor, to a second user account a list of content items associated with the second user account that are within the minimum similarity threshold;
receiving, by a processor, from the second user account a selection from the list of content items; and contributing, by a processor, content items to the event content collection based on the selection.

14. The method of claim 9, further comprising:
processing, by a processor, additional content items in a second user account that are generated after transmitting a confirmation approving sharing the event content collection;
identifying, by a processor, that the additional content items are within a threshold similarity to the event content collection; and
contributing, by a processor, the additional content items to the event content collection.

15. The method of claim 14, further comprising:
after a threshold amount of time has passed since a last image was added to the event content collection, marking the event content collection as closed to adding more images.

16. The method of claim 9, further comprising:
joining a second user account to the event content collection when the user account accepts a suggestion to share the event content collection;
after joining the second user account to the event content collection, scanning the second user account for content items from the second user account to contribute to the event content collection;
identifying one or more content items from the second user account to contribute to the event content collection, the one or more content items having the common attribute; and
adding the one or more content items from the second user account to the event content collection.

17. A non-transitory computer-readable storage medium having stored therein processor-executable instructions for causing a processor to:
determine a common attribute for a plurality of images;
cluster the plurality of images having the common attribute as an event;
identify a user account satisfying a minimum similarity threshold for the event based on the common attribute of the event;
exclude a subset of images from the event;
determine a second common attribute for the excluded subset of images;
reassign the excluded subset of the images to a new cluster having the second common attribute; and
share the event with the user account.

18. The non-transitory computer-readable storage medium of claim 17, wherein the computer-readable storage medium further contains instructions for causing a processor to:
provide a suggestion to share the event to the user account in association with an image import operation.

19. The non-transitory computer-readable storage medium of claim 17, wherein the computer-readable storage medium further contains instructions for causing a processor to:
determine a probable label for the event based on an analysis of images clustered in the event; and
include the probable label with a suggestion to share the event.

20. The non-transitory computer-readable storage medium of claim 17, wherein the computer-readable storage medium further contains instructions for causing the processor to:
determine a plurality of probable labels for the event based on an analysis of images clustered in the event;

present the plurality of probable labels to user account and a second user account;
receive selections from the user account and the second user account from the probable labels; and
assigning at least one of the selected probable labels to the event.

* * * * *